United States Patent Office 3,268,248
Patented August 23, 1966

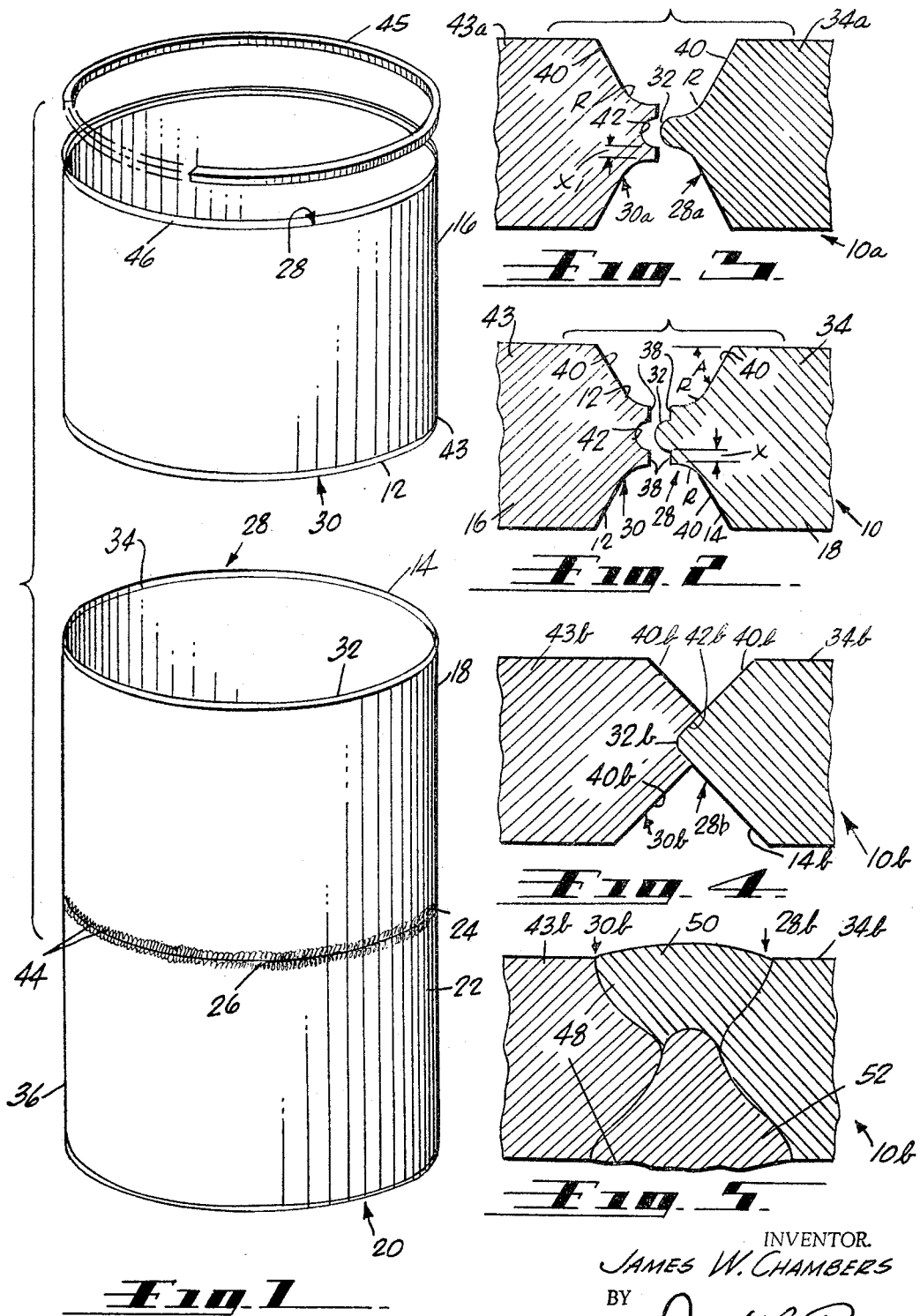

3,268,248
INTER-LOCKING WELDED JOINT
James W. Chambers, Rolling Hills Estates, Calif., assignor to Douglas Aircraft Company, Inc., Santa Monica, Calif.
Filed Nov. 8, 1963, Ser. No. 322,423
1 Claim. (Cl. 285—286)

This invention relates to an inter-locking welded joint and method of making the same, and more particularly to a welded joint which interlocks and maintains dimensional integrity between abutting edges during the welding cycle on work pieces.

Prior art methods of welding large objects together where dimensional integrity must be maintained between abutting edges requires expensive holding fixtures to maintain joint alignment during the welding operation.

Fabrication of large, cylindrical missile components at a location remote from the loading and launching sites imposes a transportation and handling problem. Segments of the component could be fabricated to sizes within the limits of existing fabrication facilities and transportation facilities and moved to the launching site for final assembly. However, with prior art welding methods, it is impractical to provide the necessary jigs and fixtures to maintain the segments in proper alignment during the welding operation at the launch site.

Accordingly, it is a primary object of the present invention to provide a welded joint and method of making same not subject to the disadvantages of prior art welded joints and methods.

Another object of the present invention is to provide a welded joint which maintains alignment of work pieces to be welded together with a minimum amount of external tooling and fixturing.

A further object of the present invention is to provide a welded joint and method for joining large, cylindrical work pieces together in end-to-end relation.

Yet another object of the present invention is to provide a new and useful inter-locking welded joint.

A still further object of the present invention is to provide a new and useful method for joining work pieces together by a welding operation.

According to the present invention, large work pieces are welded together by machining mating, interlocking contours into abutting edges of the work pieces to maintain dimensional integrity during the welding operation. The area adjacent the interlock is recessed to provide a groove for the reception of filler material during the welding operation. In the case of cylindrical work pieces, they may be stacked vertically with the mating contours in engagement to maintain radial dimensional integrity between the annular abutting edges of the work pieces. Hydraulic clamping devices may be employed to clamp the work pieces together during the welding operation.

After the work pieces have been clamped together, conventional welding practices may be followed to fuse the work pieces together.

Although the invention will be described in connection with cylindrical work pieces and annular welds, it is to be understood that interlocking weld-joint and method of the invention may be used on non-cylindrical work pieces and linear welds.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

FIGURE 1 is a perspective view of three cylindrical work pieces which may be provided with the interlocking weld-joint of the present invention and which may be joined together in accordance with the method of the present invention;

FIG. 2 is an enlarged cross-sectional view of a first embodiment of an interlocking weld-joint of the present invention;

FIG. 3 is an enlarged, cross-sectional view of a second embodiment of an interlocking joint of the present invention;

FIG. 4 is an enlarged, cross-sectional view of a third embodiment of an interlocking weld-joint of the present invention before the welding operation has been performed thereon; and FIG. 5 is a cross-sectional view of the joint FIGURE 4 after the welding operation has been performed thereon.

Referring again to the drawing and particularly to FIGURES 1 and 2, an interlocking weld-joint constituting a first embodiment of the present invention, generally designated 10, may be employed to interlock and maintain radial, dimensional integrity between annular abutting edges 12 and 14 of cylindrical members or segments 16 and 18, respectively, during the welding cycle which joins the members 16 and 18 together into an integral cylindrical structure 20. The structure 20 also includes a segment 22 having an upper, annular edge 24 which abuts the lower annular edge 26 of the segment 18. The structure 20 may comprise a large high pressure vessel, a large motor case or the like. The segments 16, 18 and 22 may be fabricated to sizes within the limits of existing fabrication facilities and transportation facilities and moved to a launching site or other point of use where they may be assembled vertically as shown in FIG. 1. The abutting edges 12, 14 and 24, 26 must be accurately matched to establish proper alignment between the individual segments. This may be accomplished with the interlocking weld-joint 10.

The weld joint 10 includes mating halves 28 and 30. The contour of the mating half 28 may be machined into the annular edges 14 and 24 of the segments 18 and 22, respectively. This may be accomplished by first machining the edges 14 and 24 in such a manner that an annular ridge 32 is formed at the circumferential centerline of each annular edge 14, 24. The encompassing sidewalls 34 and 36 of the segments 18 and 22 are then undercut on a suitable radius R starting a distance X from the base 38 of the ridge 32 and continuing to a point of intersection with a flat plane forming an angle A with the associated vertical sidewall 34, 36. This machining operation leaves an annular shoulder 38 on each side of the ridge 32. The sidewalls 34 and 36 may then be machined away on the angle A on both sides of each sidewall to form flat faces such as those shown at 40 for the sidewall 34.

While a number of different dimensions will manifest themselves for the ridge 32, the shoulders 38, the radii R and the angles A, it has been found that the following dimensions may be employed with a sidewall 34, 36 of three-quarter inch thickness: ridge $32=\frac{1}{8}''$; shoulder $38=\frac{1}{16}''$; $R=\frac{3}{16}''$; $A=30°$.

The mating half 30 is provided with an annular groove 42 which is machined into the sidewall 43 of segment 16 and which has a centerline corresponding to the circumferential centerline of each annular edge 12, 26. The mating half 30 is also provided with annular shoulders 38, radii R and faces 40 which are identical with those of the matching half 28.

The segments 16, 18 and 22 may then be stacked vertically with the ridges 32 and the grooves 42 of the respective segments interlocking each other. Hydraulic clamping devices, not shown, may be used to clamp the segments together while the recesses formed by the flat faces 40 and radii R are filled with a suitable filling material and welded to the adjacent edges, as shown at 44 in FIG. 1. During shipment, the abutting edges may be protected with a suitable end cap, such as the cap 45 shown for the edge 46 of segment 16.

Referring now to FIG. 3, an interlocking weld-joint constituting a second embodiment of the present invention, generally designated 10a, includes mating halves 28a and 30a which may be machined into the sidewalls 34a and 43a, respectively, of a cylindrical structure or segment, not shown.

The mating half 28a includes an annular ridge 32, a radius R and a flat face 40, all of which may be identical with similar elements of the mating half 28 except that the annular ridges 38 are eliminated so that the radius R joins the base of the annular ridge 32.

The mating half 30a is provided with an annular groove 42, a radius R and a flat face 40 which may be identical with the like elements on mating half 30 except that the radius R is started at a distance $X_1$ from the top of groove 42 which is only one-half the distance X employed on the mating half 30.

The recesses formed by the radii R and the flat faces 40 in the mating halves 28a and 30a may be welded with a suitable filler material in identical manner to those of the FIGURE 2 embodiment.

Referring now to FIGS. 4 and 5, an interlocking, welded joint constituting a third embodiment of the present invention, generally designated 10b, includes mating halves 28b and 30b which may be machined into the sidewalls 34b and 43b of cylindrical segemnts identical to those shown in FIG. 1 embodiment. The mating half 28b may be machined into the abutting edge 14b of sidewall 34b having a one inch thickness by machining a first face 40b on each side of the circumferential centerline of the sidewall 34b. Each face 40b forms an angle of 45 degrees with a horizontal line B pasisng through the joint 10b. The faces 40b may be joined with a $\frac{5}{32}''$ radius to form an annular ridge 32b.

The mating half 30b may be similarly shaped with flat faces 40b which are joined together with an annular groove 42b. When the ridge 32b is seated in the groove 42b, one face 40b of the mating half 30b intersects its corresponding face 40b of the mating half 28b at a point lying ¼ inch inside the outside of the sidewall 34b. The other face 40b of the mating half 30b intersects its corresponding face 40b of the mating half 28b at a point $\frac{7}{16}''$ inside of the inner side of the sidewall 34b. Thus, the centerlines of groove 42b and ridge 32b are offset from the centerlines of their associated sidewalls a like amount. The sidewalls 34b and 43b may be joined together in interlocking relation by filling the recesses created by the faces 40b with a suitable filler material 48 by conventional welding methods.

The filler material 48 is placed in the joint 10b in two passes with a bead 50 being formed by the first pass and a bead 52 being formed by the second pass.

In actual practice, the bead 50 was formed on sidewalls 34b and 43b of forged plate with an electrode having a diameter of $\frac{3}{16}''$ at an amperage of about 800–900 and a voltage of about 31–34 at a travel speed of 10–14 inches per minute.

The bead 52 was formed with a $\frac{3}{16}''$ electrode at an amperage of 950–1050, a voltage of 34–37 and a travel speed of 10–14 inches per minute.

While the particular welded joints and method of forming same herein shown and described in detail are fully capable of attaining the objects and providing the advantages hereinbefore stated, it is to be understood that they are merely illustrative of the presently preferred embodiments of the invention and that no limitations are intended to the details of construction, design or method steps herein shown other than as defined in the appended claim.

I claim:

An inter-locking weld-joint for maintaining dimensional integrity between annular abutting edges of cylindrical workpiece segments while they are being welded together, comprising:

an annular groove provided on one of said abutting edges;

an annular ridge provided on the other of said edges, said groove and said ridge being located on said edges in predetermined positions, and having rounded coacting surfaces whereby said segments are properly aligned with each other upon engagement of said groove and said ridge when said abutting edges are brought together; and recesses extending inwardly from peripheral wall surfaces on said edges adjacent said ridge and said groove for reception of filling material during welding of said segments together, said ridge and said groove having an annular shoulder adjacent each side thereof, the faces of said shoulders being perpendicular to the axis of said segment, said recesses each including a flat face extending angularly to a peripheral wall of an associated segment, said recesses having an undercut radius joining an associated shoulder to said flat face.

References Cited by the Examiner

UNITED STATES PATENTS

| | | | |
|---|---|---|---|
| 1,532,842 | 4/1925 | Stresau | 285—22 |
| 1,794,363 | 3/1931 | Burnish | 285—22 X |
| 1,912,993 | 6/1933 | Murray | 285—286 X |
| 1,977,678 | 10/1934 | Kidd | 285—22 X |
| 2,122,994 | 7/1938 | Southgate | 29—423 X |
| 2,359,350 | 11/1940 | Bruno | 285—286 |
| 2,646,995 | 7/1953 | Thompson | 285—286 |
| 2,982,018 | 5/1961 | Neely | 29—483 |
| 3,002,191 | 9/1961 | Thielsch | 29—483 |
| 3,003,601 | 10/1961 | Ott | 285—21 X |

FOREIGN PATENTS

| | | |
|---|---|---|
| 630,864 | 11/1961 | Canada. |
| 833,933 | 8/1938 | France. |
| 920,868 | 1/1947 | France. |
| 498,219 | 1/1939 | Great Britain. |
| 527,107 | 10/1940 | Great Britain. |
| 656,696 | 8/1951 | Great Britain. |
| 825,222 | 12/1959 | Great Britain. |
| 251,975 | 9/1948 | Switzerland. |
| 310,029 | 12/1955 | Switzerland. |

CARL W. TOMLIN, *Primary Examiner.*

EDWARD C. ALLEN, *Examiner.*

D. W. AROLA, *Assistant Examiner.*